3,050,564
PREPARATION OF NEW HYDROPEROXIDES BY THE COOXIDATION OF OLEFINIC COMPOUNDS AND MERCAPTANS
Alexis A. Oswald, Sarnia, Ontario, Canada, assignor to Esso Research and Engineering Company, a corporation of Delaware
No Drawing. Filed Dec. 2, 1958, Ser. No. 777,617
10 Claims. (Cl. 260—609)

This invention relates to a novel and useful class of compounds and to their preparation by the co-oxidation of mercaptans and olefins. More particularly, the invention relates to hydroperoxides defined by the following formula:

$$R-R'-S-R''$$
$$\phantom{R-R'-}|$$
$$\phantom{R-R'-}O_2H$$

wherein R and R'' each stand for an aromatic hydrocarbon radical such as phenyl, tolyl, xylyl, naphthyl, anthracyl, or a halogen substituted aromatic hydrocarbon radical such as chlorophenyl or bromophenyl. R also includes divalent aromatic radicals, e.g. $C_6H_4$ such as constitute a part of the indane structure. R' stands for a saturated hydrocarbon radical of 2 to 10 carbon atoms. The invention also relates to the preparation of such hydroperoxides by the co-oxidation at low temperatures of aromatic mercaptans and aryl-olefins, or halogen substituted derivatives of such compounds.

The removal of nitrogen-containing compounds such as pyrrole, from petroleum products, especially from shale oil, is very important from the viewpoint of product stability. The hydroperoxide of this invention will react with such compounds forming nitrogen and sulfur-containing precipitates that can easily be separated from the petroleum fraction. Hydroperoxides are also useful as oxidation initiators in the vapor-phase partial oxidation of hydrocarbons for chemical manufacture and as polymerization catalysts because of their tendency to dissociate.

It is known that mercaptans and olefins can be co-oxidized to give substituted beta-hydroxy-ethyl alkyl or aryl sulfoxides.

It has now been discovered that if aromatic mercaptans, e.g., thiophenol and certain derivatives thereof, such as 4-chlorothiophenol, 4-toluene thiol, 2,4-dimethyl benzene thiol, and 2-naphthalene thiol, are co-oxidized with an aryl-olefin, e.g., styrene, α-methyl styrene, 4-chlorostyrene and indene, at temperatures in the range of from about −50° C. to 0° C., the hydroperoxides having a formula in accordance with the formula hereinbefore set forth can be isolated. The mechanism of hydroperoxide formation involves free radical intermediates.

A few representative reactions of this co-oxidation process are shown in the following table:

TABLE I

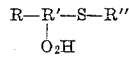

The oxygen necessary to these co-oxidation reactions may be supplied as pure gas or liquid, but the use of molecular oxygen in mixture with other gases (e.g. air) is also possible. The pressure of oxygen in the reaction system may vary from 0.05 atm. to 50 atm., preferably between 0.2 atm. and 5 atm. The oxygen may be supplied to a closed system through valves, but the simplest way to introduce it is through a gas inductor into a liquid reaction mixture.

Although co-oxidation reactions can be carried out with the three components; mercaptans, olefins and oxygen without diluent, it is usually preferable to use a solvent. If the isolation of the product is desired, it is advisable to choose a hydrocarbon or a hydrocarbon mixture, in which the starting compounds are more soluble than the hydroperoxide. The invention may be more easily understood from the following examples:

Example I

THE PREPARTION OF 2-(1-HYDROPEROXY-) INDANYL 2-NAPHTHYL SULFIDE 16 grams (0.1 mole) of 2-naphthalene thiol and 11.6 grams (0.1 mole) of indene were dissolved in a mixture of 300 ml. n-heptane and 125 ml. benzene. Air was introduced into the solution while cooling it with ice water. After two hours reaction time, 6 grams of white crystalline precipitate was filtered off. Throughout the time of reaction the reaction mixture was maintained at a temperature of about 0° C. This substance had a peroxide content of 98% as measured by the iodide method. On attempting to determine the melting point the product started to decompose at 80° C. Elemental analyses gave the following values: C, 73.66; H, 5.54; S, 10.1 (the calculated values for the 2-(1-hydroperoxy-) indanyl 2-naphthyl sulfide are the following: C, 73.99; H, 5.23; S, 10.4).

On further introduction of air into the reaction solution, an additional amount of this product of high peroxide content was obtained.

Example II

THE PREPARATION OF (2-HYDROPEROXY-2-PHENYL-) PROPYL 2-NAPHTHYL SULFIDE (2-hydroperoxy-2-phenyl-) propyl 2-naphthyl sulfide was prepared as follows: 32 grams (0.2 mole) of 2-naphthalene thiol and 11.8 grams (0.1 mole) of α-methyl styrene were dissolved in a mixture of 300 ml. n-heptane and 50 ml. of benzene. Into the solution air was introduced while the temperature of the solution was maintained at about 0° C. After 6½ hours the reaction mixture was cooled to −5° C. and 5 grams of clear yellow oil separated as a bottom phase from the reaction solution. This oil was separated and examined for peroxide content by the iodide and ferrous sulfate method. The iodide method gave 81% peroxide, while the ferrous sulfate method gave a peroxide content of 12%. Peroxide values obtained by the ferrous sulfate titanous chloride method are generally used in the petroleum industry. However, for the determination of absolute concentration of hydroperoxides, this method was found to give unreliably low values. The freezing point of this oil was dedetermined to be −10° C. The method of determination was the freezing curve method.

Example III

THE PREPARATION OF (2-HYDROPEROXY-2-PHENYL-) PROPYL 4-CHLOROPHENYL SULFIDE 7.2 grams (0.05 mole) 4-chlorothiophenol and 5.9 grams (0.05 mole) α-methyl styrene were dissolved in 300 ml. of a petroleum distillate boiling in the range of 300° to 600° F. An excess of oxygen was introduced into the solution while cooling with ice water. After 20 hours reaction time 9.9 grams of almost colorless liquid separated at the bottom. This liquid had 30% peroxide content according to the ferrous sulfate method. On standing at room temperature the substance lost its peroxide character and was converted to a white crystalline solid, (2-hydroxy-2-phenyl-) propyl 4-chlorophenyl sulfoxide.

Example IV

THE PREPARATION OF (2-HYDROPEROXY-2-PHENYL-) PROPYL PHENYL SULFIDE

With a method analogous to that used in the previous example, 6.7 grams of peroxidic substance was prepared by the co-oxidation of 5.5 grams (0.05 mole) of thiophenol and 5.9 grams (0.05 mole) of α-methyl styrene. The peroxide content of this substance is 18% according to the ferrous sulfate method.

Example V

THE PREPARATION OF (2-HYDROPEROXY-2-PHENYL-) ETHYL PHENYL SULFIDE 5.5 grams (0.05 mole) of thiophenol and 5.2 grams (0.05 mole) of styrene were dissolved in 150 ml. n-heptane. Air was introduced into the solution, while cooling it with ice water. After 5 hours, 4 grams of a colorless liquid separated at the bottom of the solution. This liquid had 10% peroxide content according to the ferrous sulfate method.

Example VI

THE PREPARATION OF 2-(1-HYDROPEROXY-) INDANYL PHENYL SULFIDE

From 5.5 grams (0.05 mole) of thiophenol and 5.8 grams (0.05 mole) of indene, 3.2 grams liquid product was obtained by a method similar to that described in the previous example. This liquid contained 12% peroxide according to the ferrous sulfate procedure.

Example VII

REMOVAL OF NITROGEN-CONTAINING ORGANIC COMPOUNDS FROM A HYDROCARBON SOLUTION BY THE ADDITION OF HYDROPEROXIDE

Two grams (0.03 mol) of pyrrole was dissolved in 100 ml. of benzene. To the solution 9.3 grams (0.03 mole) of (2-hydroperoxy-2-phenyl-) propyl 2-naphthyl sulfide, the hydroperoxide prepared in Example II, was added and the solution was placed into an oven at 110° F. Following the addition of the hydroperoxide, the color of the solution changed to brown in 15 minutes. After sixteen hours at 110° F. the following observations were made on the reaction mixture. Control solutions containing benzene and pyrrole and the hydroperoxide in the same amounts and same concentrations as they appear in the above-described solution were subjected to the same conditions and the corresponding observations made thereon.

TABLE II

| Components in Benzene Solutions (each in 0.3 m./l. cc.) | Observations After 16 hrs. at 110° F. | |
|---|---|---|
| | Color (Tag-Robinson) | Sediment (mg./100 ml.) |
| Hydroperoxide+pyrrole | 0 | 582 |
| Hydroperoxide | 9 | Nil |
| Pyrrole | 25+ | Nil |

The sediment was produced by the reaction of the hydroperoxide with the pyrrole. This is shown by the results of an analysis made of the sediment which revealed it to contain 7.4% nitrogen and 7.5% sulfur. The solution containing the hydroperoxide alone did not contain any sediment but on further standing precipitated colorless crystals which upon analysis showed them to be without any peroxide character. The solution containing pyrrole alone gave no evidence of precipitation after several hours of standing.

Example VIII

LOW TEMPERATURE POLYMERIZATION OF STYRENE BY 2-(1-HYDROPEROXY-) INDANYL 2-NAPHTHYL SULFIDE 0.3 gram (0.001 mole) of 2-(1-hydroperoxy-) indanyl 2-naphthyl sulfide prepared by the method given in Example I was added to 34.6 grams (0.3 mole) of styrene and the mixture was placed into a cold box at +5° C. for 3 months. At the end of this period the mixture was a very viscous liquid with a refractive index, $n_D^{20}$ 1.5584. On distillation at 20 mm. from a steam bath, only 75% of the material could be removed. The remaining 25% is a solid, rubbery substance, polystyrene. Styrene without added hydroperoxide in a control experiment had $n_D^{20}$ 1.5468 and could be distilled under the same circumstances in 99%.

The hydroperoxides produced by this invention decompose at various temperatures depending upon their individual structures. By choosing suitable mercaptans and suitable olefinic reactants it is possible to prepare hydroperoxides which are stable at relatively high temperatures.

The term "aryl-olefin" as used herein shall be interpreted to mean an olefin compound or a radical having an olefinic linkage wherein at least one valence of the group is satisfied by an aromatic radical such as phenyl, tolyl, xylyl, benzyl, naphthyl, anthracyl or a halogen substituted aromatic radical such as chlorophenyl or bromophenyl.

The term "aromatic mercaptan" as used herein shall be interpreted to include both a non-substituted aromatic mercaptan and a halogen substituted aromatic mercaptan wherein one or more halogen atoms are substituted for hydrogen atoms connected to a carbon atom of an aromatic ring.

The term "saturated hydrocarbon radical" as used herein shall be interpreted to include both open chain and cyclic radicals which may be derived from saturated hydrocarbon compounds having 2 to 10 carbon atoms per molecule, e.g. ethane, propane, n-butane, isobutane, n-pentane, isopentane, neopentane, n-hexane, neohexane, n-heptane, octane, isooctane, nonane, decane, etc., and which constitute the theoretical residue of such compounds after 3 hydrogen atoms have been removed, or, in the case of the indane type structure after 4 hydrogen atoms have been removed.

The term "aromatic hydrocarbon radical" as used herein shall be understood to include both monovalent and divalent radicals.

What is claimed is:

1. A hydroperoxide having the general formula:

$$\underset{\underset{O_2H}{|}}{R-R'-S-R''}$$

wherein R and R'' are radicals having from 6 to 14 carbon atoms, R being selected from the class consisting of aryl, alkaryl and halogen-substituted aryl radicals and R'' being selected from the class consisting of naphthyl and halogen-substituted aryl radicals, and R' is a saturated acyclic hydrocarbon radical having from 2 to 10 carbon atoms, the hydroperoxy group and sulfur atom of said hydroperoxide being bonded to next adjacent carbon atoms of R'.

2. A process for producing a hydroperoxide of general formula:

$$\underset{\underset{O_2H}{|}}{R-R'-S-R''}$$

which comprises passing a gas containing molecular oxygen through a reaction mixture containing an olefinic compound of general formula:

$$R-R'$$

wherein R' is an acyclic monolefin of 2 to 10 carbon atoms and R is a radical selected from the group consisting of aryl, alkaryl and halogen-substituted aryl radicals and an aromatic mercaptan of general formula:

$$R''-SH$$

wherein R'' is a radical of 6 to 14 carbon atoms selected from the group consisting of naphthyl and halogen-substituted aryl radicals while maintaining said mixture at a temperature between —50° and 0° C.

3. A hydroperoxide according to claim 1 wherein R is a phenyl radical.

4. A hydroperoxide according to claim 1 wherein said R'' is a chlorophenyl radical.

5. A hydroperoxide according to claim 1 wherein said R'' is a naphthyl radical.

6. A hydroperoxide according to claim 1 wherein said R' is a $C_2$ to $C_3$ saturated acyclic hydrocarbon radical.

7. (2-hydroperoxy-2-phenyl-) propyl 2-naphthyl sulfide.

8. (2-hydroperoxy-2-phenyl-) propyl 4-chlorophenyl sulfide.

9. A process in accordance with claim 2 wherein the molecular oxygen-containing gas is air.

10. A process in accordance with claim 2 wherein said mixture contains a hydrocarbon solvent.

References Cited in the file of this patent

UNITED STATES PATENTS

| | | |
|---|---|---|
| 2,454,108 | Walling | Nov. 16, 1948 |
| 2,515,120 | Harman | July 11, 1950 |